(12) United States Patent
Uzawa et al.

(10) Patent No.: US 6,266,129 B1
(45) Date of Patent: Jul. 24, 2001

(54) DIGITAL PHOTOGRAPH PROCESSING SYSTEM

(75) Inventors: Satoshi Uzawa; Koji Tajima; Katsuya Hiraga; Yawara Inoue; Yawara Uchiyama, all of Mobara (JP)

(73) Assignee: Futaba Denshi Kogyo Kabushiki Kaisha, Mobara (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,060

(22) Filed: Jun. 16, 1998

(30) Foreign Application Priority Data

Jun. 17, 1997 (JP) .................................................. 9-159516

(51) Int. Cl.[7] ........................... G03B 27/52; H04N 1/387; H04N 1/46
(52) U.S. Cl. ............................ 355/40; 358/453; 358/538
(58) Field of Search .......................... 355/40, 18; 348/64; 358/524, 528, 538, 539, 451, 453, 470, 483, 302

(56) References Cited

U.S. PATENT DOCUMENTS

| | | | |
|---|---|---|---|
| 4,733,304 | * | 3/1988 | Homma et al. ...................... 358/280 |
| 5,018,017 | * | 5/1991 | Sasaki et al. ....................... 358/209 |
| 5,261,987 | * | 11/1993 | Luening et al. ...................... 156/235 |
| 5,459,586 | * | 10/1995 | Nagasoto et al. .................... 358/450 |
| 5,512,396 | * | 4/1996 | Hicks ..................................... 430/21 |
| 5,781,665 | * | 7/1998 | Cullen et al. ........................ 382/254 |
| 5,832,141 | * | 11/1998 | Ishida et al. .......................... 382/298 |
| 5,850,298 | * | 12/1998 | Narahara et al. ..................... 358/518 |
| 5,861,962 | * | 1/1999 | Maeda .................................. 358/451 |
| 5,867,611 | * | 2/1999 | Kanda .................................. 382/284 |
| 5,870,138 | * | 2/1999 | Smith et al. .......................... 348/143 |

OTHER PUBLICATIONS

U.S. Department of State form DSP–11, Dec. 1987.*

* cited by examiner

Primary Examiner—Christopher E. Mahoney
(74) Attorney, Agent, or Firm—Oblon, Spivak, McClelland, Maier & Neustadt, P.C.

(57) ABSTRACT

A digital photograph processing system capable of facilitating editing operation after photographing and outputting a photograph of defined dimensions in a short period of time. A cut range of picture data which permits a distance between two points of picture data required to be realized as an actual predetermined dimension is operated by merely inputting the two points by operation, resulting in a photograph being outputted. This highly facilitates designation of a cut position as compared with the conventional image or picture processing.

9 Claims, 2 Drawing Sheets

DIGITAL PHOTOGRAPH PROCESSING SYSTEM

BACKGROUND OF THE INVENTION

This invention relates to a digital photograph processing system, and more particularly to a digital photograph processing system for outputting a photograph while determining a ratio of picture data of a desired range to a whole range of the photograph based on digital picture data.

A digital photograph system using a digital still picture is so constructed that a picture which has been conventionally recorded on a silver salt film by silver salt photograph techniques is converted into an electric signal by a CCD or the like, resulting in being subject to digital conversion and then outputted from a printer. Thus, the digital photograph system permits the picture photographed to be confirmed immediately after the photographing without requiring operation in a dark room and facilitates additional printing of the photograph.

Also, the digital photograph system permits the picture to be edited and stored in the form of digital data, to thereby ensure construction of a data base for customers and the like and facilitate change of a background, change of a dress or the like.

A certification photograph generally has longitudinal and lateral dimensions determined or defined depending on applications thereof. In particular, in a certification photograph for a passport, a length of a head of a subject and a margin above the head are defined as well. A certificate photograph for any other application likewise has a size of the head defined to a degree. Thus, an excessively large or small size of the head on the photograph is not permissible.

In conventional silver salt photograph techniques, it is required to adjust a size of a photograph when photographing or printing takes place. When a negative film is used, enlargement into a required size is carried out during printing onto a developing paper.

Such silver salt photograph techniques require operation in a dark room, much time is required between photographing and completion of a photograph.

On the contrary, techniques of using an instant film permits a photograph to be completed in a short period of time. However, it fails in enlargement of the photograph, so that it is required to adjust a size thereof during photographing. For this purpose, techniques such as a variation in distance of the photographing, employment of any suitable lens or the like are employed to adjust a size of a picture on the film.

The digital photograph system permits a picture to be formed and stored in the form of digital data, so that both enlargement and reduction of the picture may be readily carried out according to a picture processing procedure. For example, when it is desired to obtain an output of 5 cm×5 cm using an output printer of 10 dots/mm in resolution, data 50 dots square are required.

Supposing that picture data are 1600×1200 dots and a region of a subject required for an identification photograph is photographed on an area 1000 dots square, picture data for a region of the subject required may be obtained by feeding the area 1000 dots square to the printer at every second dot.

Enlargement and reduction of a picture by digital picture processing require two data. One of the data relates to a portion of an original picture to be used and the other relates to a portion of an output range to be photographed.

The latter data may be mechanically determined by inputting of information required. For example, when a printer of 8 cm×6 cm in output size and 10 dots/mm in resolution is used, data fed to the printer are 800×600 dots in size, which are represented by X-Y coordinates of which an upper left is (0, 0) and a lower right is (799, 599).

When a photograph size of, for example, 5 cm×5 cm required as an output is inputted, it is found by mechanical calculation that a central region of 500×500 or a region between (150, 50) and (749, 549) is to be used.

The former data is varied depending on the original picture, therefore, it is carried out to display the original picture on a CRT or the like to indicate a region to be cut out. The most typical way is to move an expandable rectangle on a picture plane by means of a mouse or the like, to thereby input upper-left and lower-right coordinates of the rectangle.

Unfortunately, such a way is not necessarily suitable for a certification photograph, because adjustment of rendering a size of a head of a subject constant and positioning of the subject on a central axis are required for the certification photograph. Designation of the rectangle cut which is carried out in the way described above renders such adjustment highly troublesome.

SUMMARY OF THE INVENTION

The present invention has been made in view of the foregoing disadvantage of the prior art.

Accordingly, it is an object of the present invention to provide a digital photograph processing system which is capable of facilitating editing operation after photographing and outputting a photograph of defined dimensions in a short period of time.

It is another object of the present invention to provide a digital photograph processing system which is capable of readily providing a cut range of a picture required for outputting a length or distance between desired two points in picture data as an actual dimension.

In accordance with the present invention, a digital photograph processing system is provided. The digital photograph processing system includes a picture input means for storing picture data of a subject therein and outputting the picture data, an operation means having the picture data inputted thereto and constructed so as to operate positional coordinates of two points on the picture data inputted, a display means for displaying the picture data in the form of an image thereon, and a memory previously stored therein with set items of the picture data during outputting thereof. The set items include an actual dimension between the two points on the picture data and actual longitudinal and lateral dimensions of a photograph to be outputted. The digital photograph processing system also includes a processing means for taking in the picture data outputted from the picture input means and carrying out an operation so that position coordinates of the two points inputted thereto by operation in the operation means are an actual dimension between the two points stored In the memory and a range of picture data which permits the set items stored in the memory to be satisfied are cut and a picture output means constructed so as to permit picture data outputted from the processing means to be outputted in the form of a photograph.

In a preferred embodiment of the present invention, the picture input means is selected from the group consisting of a digital camera and a storage unit having the picture already stored therein and constructed so as to output picture data on a face of a person, so that digital photograph processing system prepares a certification photograph. The operation means inputs position coordinates of two points on a top of a head of the person and a jaw thereof by operation. The memory is stored therein with the set items including a length of the face in the photograph outputted, an upper margin of the photograph, and longitudinal and lateral dimensions of the photograph. The processing means carries out an operation for cutting a range of picture data which permits a distance between the head top of the person and the jaw thereof to be an actual dimension of a length of the face included in the set items stored in the memory and a photograph of actual dimensions which satisfy the set items to be outputted. The picture output means is constituted by a printer which permits the picture data to be outputted in the form of a photograph.

In a preferred embodiment of the present invention, the processing means is constructed so as execute a predetermined operation of converting the cut range in correspondence to dot pitches and the number of dots possessed by the picture output means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a digital photograph processing system according to the present invention will be described hereinafter with reference to the accompanying drawings.

Figure 1:
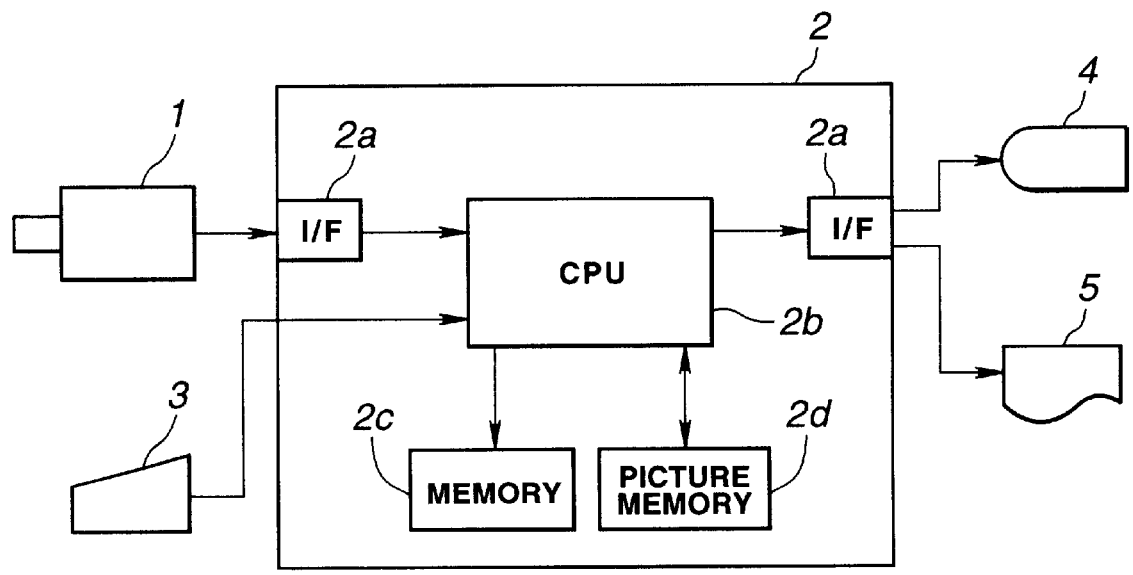
FIG. 1 is a block diagram showing an embodiment of a digital photograph processing system according to the present invention.

Referring first to FIG. 1, an embodiment of a digital photograph processing system according to the present invention is illustrated. A digital photograph processing system of the illustrated embodiment generally includes a picture input means 1 such as a digital camera, a scanner or the like for outputting image data on a subject, a processing means 2 such as a personal computer or the like for executing picture cutting operation of cutting a predetermined range of a picture based on the picture data inputted thereto from the picture input means 1, an operation means 3 such as a key board, a mouse or the like through which the picture cutting operation is carried out, a display means 4 such as a CRT or the like, and a picture output means 5 which permits a photograph to be outputted therefrom.

The processing means 2 includes an I/F section 2a through which data are fed from the picture input means 1 to the picture output means 5, a CPU 2b for controlling and processing picture cutting operation according to an execution program, a memory 2c for storing therein a parameter of each of items on cutting of picture data, and a picture memory 2d for storing therein picture data processed in the CPU 2b.

The picture input means 1 outputs picture data having a range equal to or larger than a cut range of a picture to the processing means 2.

The CPU 2b of the processing means 2 carries out an operation based on the picture data inputted thereto so that a length or distance between two points A and B designated by operation of the operation means has a predetermined value. This results in a cut range of a picture required being automatically set.

The picture data designate the points A and B through movement of a cursor of the operation means 3 or the like while being displayed on the display means 4.

The picture data on the cut range thus automatically set are outputted in the form of a photograph from the picture output means 5.

Figure 2:
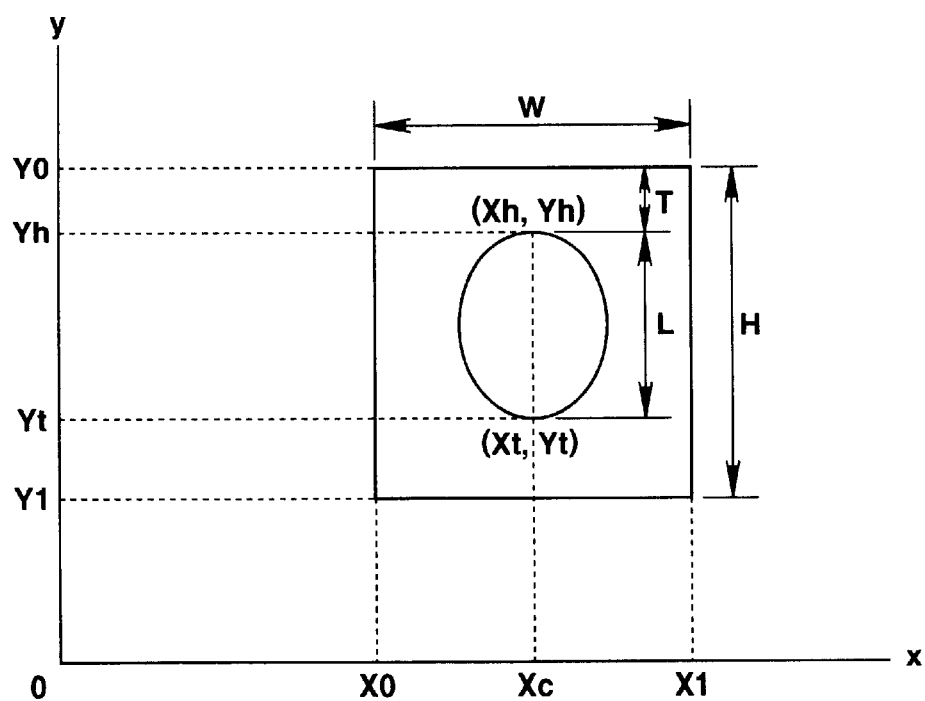
FIG. 2 is a diagrammatic view showing a range of a picture to be cut.
Figure 3:
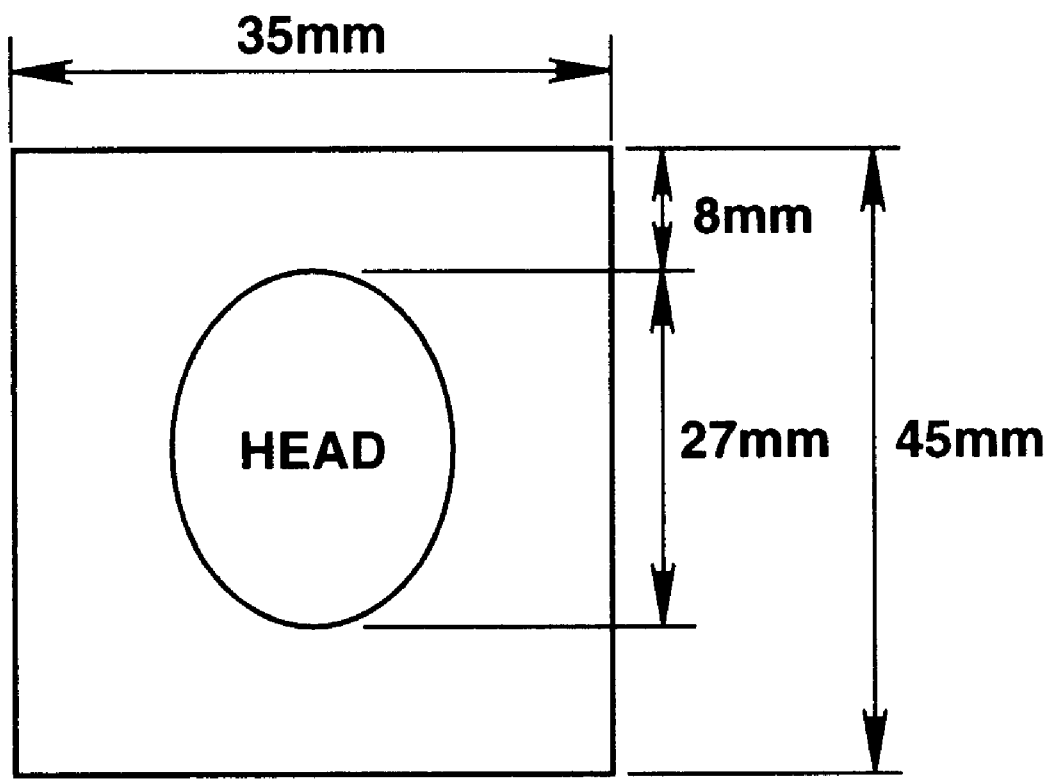
FIG. 3 is a schematic view showing dimensions of a certification photograph for a passport.

Now, the manner of operation of cutting a predetermined range of a picture by the digital photograph processing system of the illustrated embodiment thus constructed will be described hereinafter in connection with outputting of a certification photograph for a passport by way of example with reference to FIGS. 2 and 3.

The operation means 3 is operated to designate a length of a face of a subject while displaying picture data on the display means 4. More specifically, the cursor is clicked at a point A on a crown or top of a head of the subject and a point B on a jaw thereof, resulting in inputting of X and Y coordinates (Xh, Yh) and (Xt, Yt) on the picture data. The X and Y coordinates on the picture data have an origin (0, 0) defined at a lower left position.

The memory 2d of the processing means 2 is previously stored therein with parameters of items including longitudinal and lateral dimensions H and W for outputting of a passport photograph, a length L of the head, and a margin T defined above the head.

The coordinate (Xh, Yh) of the head top point A and the coordinate (Xt, Yt) of the jaw point B thus inputted, as well as the parameters H, W, F and T for outputting which are read out of the memory 2d are used to determine a central position of an X axis of a rectangle to be cut by an operation according to the following expression:

$$Xc=(Xh+Xt)/2$$

Likewise, an upper left coordinate of the rectangle is obtained by an operation according to the following expressions:

$$X0=Xc-W/2\cdot(Yh-Yt)/L$$

$$Y0=Yh+T\cdot(Yh-Yt)/L$$

Also, a lower right coordinate of the rectangle is operated according to the following expressions:

$$X1=Xc+W/2\cdot(Yh-Yt)/L$$

$$Y1=Y0-H\cdot(Yh-Yt)/L$$

Such expressions are indicated at (1) in the lump.

Thus, the rectangle is cut at a range thereof between (X0, Y0) and (X1, Y1). A distance between X0 and X1 corresponds to a lateral dimension W of a photograph outputted and a distance between Y0 and Y1 corresponds to a longitudinal dimension H of the photograph.

Designated positions of the parameters described above are shown in FIG. 2.

For example, supposing that a printer used for the picture output means 5 has resolution (dot pitches) of 10 dots/mm, the coordinate (Xh, Yh) of the head top point A designated in the operation means 3 is (400, 500) and the coordinate (Xt, Yt) of the jaw point B is (400, 180); the processing means 2 reads out parameter for outputting from the memory 2d. Supposing that the parameters read include the head length L of 27 mm, the margin T above the head of 8 mm, the longitudinal dimension H of 45 mm and the lateral dimension W of 35 mm; the central position of the X axis of the rectangle cut is calculated, as follows:

$$Xc=(Xh+Xt)/2=(400+400)/2=400$$

The upper left coordinate of the rectangle is as follows:

$$X0=Xc-W/2\cdot(Yh-Yt)/L=400-35/2\cdot(450-180)/27=225$$

$$Y0=Yh+T\cdot(Yh-Yt)/L=450+8\cdot(450-180)/27=530$$

Also, the lower right coordinate of the rectangle is operated, as follows:

$$X1=Xc+W/2\cdot(Yh-Yt)/L=400+35/2\cdot(450-180)/27=575$$

$$Y1=Y0-H\cdot(Yh-Yt)/L=530-45\cdot(450-180)/27=80$$

This results in a range between (225, 530) and (575, 80) being cut, wherein 350 dots between X0 and X1 coincide with the lateral dimension W (35 mm) of the photograph outputted and 450 dots between Y0 and Y1 coincide with the longitudinal dimension H (45 mm) thereof.

In general, supposing that the picture is developed at the central region and the range is between (X2, Y2) and (X3, Y3) when the above-described picture data are printed by a printer of P (dots/mm) in dot pitch and Xp and Yp in the number of dots, X2 to Y3 are expressed, as follows:

$$X2=Xp/2-W/2\cdot P$$

$$Y2=Yp/2+H/2\cdot P$$

$$X3=Xp/2+W/2\cdot P$$

$$Y3=Yp/2-H/2\cdot P$$

Such expressions are indicated at (2) in the lump.

A coordinate conversion expression from the coordinates on the picture plane to those on the printer is linear as indicated by (X0, Y0)→(X2, Y2) and (X1, Y1)→(X3, Y3). A coordinate (x, y) on the picture plane is converted into a coordinate (X, Y) on the printer, as follows:

$$X=X2+(x-X0)(X3-X2)/(X1-X0)$$

$$Y=Y2+(y-Y0)(Y3-Y2)/(Y1-Y0)$$

Two such expressions are indicated at (3) in the lump.

The above-described expressions (1) and (2) are substituted for the expression (3) for execution of an operation, so that results of the conversion may be directly obtained.

The cut range of the picture is calculated by the expression (1) based on the coordinates of the two points or the head top point A and jaw point B obtained by operation in the operation means 1 and data are outputted to the positions on the printer coordinates converted by the expression (3), resulting in the data being arranged in the range indicated by the expression (2).

As can be seen from the foregoing, the present invention is so constructed that a cut range of picture data which permits a distance between two points of picture data required to be realized as an actual predetermined dimension is operated by merely inputting the two points by operation, resulting in a photograph being outputted. Such construction highly facilitates designation of a cut position as compared with the conventional image or picture processing.

This permits photographs of various dimensions to be outputted from a single copy in a reduced period of time. In particular, the present invention facilitates preparation of a variety of certification photographs while minimizing restrictions such as layout for photographing and the like. Also, it facilitates edition after photographing because of eliminating any operation in a dark room.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A digital photograph processing system comprising:
   a picture input means including a digital camera and a storage unit for storing picture data of a face of a person and outputting said picture data;
   a display means for displaying said picture data as an image;
   an operation means for receiving said picture data and for inputting positional coordinates of two points positioned respectively on a top of a head of the person and a jaw of the person;
   a memory for storing set items of the picture data, said set items including an actual dimension between said two points on said picture data, an upper margin of a certification photograph to be outputted, and actual longitudinal and lateral dimensions of the certification photograph;
   a processing means for computing a cut range of the picture data based upon the set items; and
   a picture output means for permitting picture data outputted from said processing means to be outputted as the certification photograph.

2. A digital photograph processing system as defined in claim 1, wherein said processing means executes a predetermined operation of converting said cut range in correspondence to dot pitches and the number of dots possessed by said picture output means.

3. A method of processing a digital photograph of a face of a person, the method comprising:
   inputting and storing picture data of the face of the person using a digital camera;
   outputting the picture data;
   inputting positional coordinates of two points positioned respectively on a top of a head of the person and a jaw of the person;
   displaying the picture data in the form of an image;
   storing set items of the picture data, the set items including an actual dimension between the two points, an upper margin of a certification photograph to be outputted, and actual longitudinal and lateral dimensions of the certification photograph;
   computing a cut range of the picture data based upon the set items; and
   outputting the picture data as the certification photograph.

4. The method as defined in claim 3, wherein the step of outputting the picture data is performed by a printer.

5. The method as defined in claim 3, wherein the step of computing comprises executing a predetermined operation of converting the cut range based upon dot pitches and number of dots associated with the picture data.

6. A digital photograph processing system comprising:
   a digital camera configured to store picture data of a face of a person and to output the picture data;

a display device configured to display the picture data in the form of an image;

a keyboard configured to input positional coordinates of two points positioned respectively on a top of a head of the person and a jaw of the person;

a memory configured to store set items of the picture data, the set items including an actual dimension between the two points, an upper margin of a certification photograph to be outputted, and actual longitudinal and lateral dimensions of the certification photograph; and a processor configured to compute a cut range of the picture data based upon the set items.

7. The system as defined in claim 6, further comprising:

a printer configured to output the picture data as the certification photograph.

8. The system as defined in claim 6, wherein the processor executes a predetermined operation of converting the cut range based upon dot pitches and number of dots associated with the picture data.

9. The system as defined in claim 6, further comprising:

an I/F section configured to receive the picture data from the digital camera.

* * * * *